(12) United States Patent
Lim et al.

(10) Patent No.: US 7,920,503 B2
(45) Date of Patent: Apr. 5, 2011

(54) APPARATUS AND METHOD FOR TRANSMITTING PACKET IN FORWARD LINK OF MULTIBEAM SATELLITE COMMUNICATION SYSTEM

(75) Inventors: Kwang Jae Lim, Daejon (KR); Soo Young Kim, Daejon (KR); Deock Gil Oh, Daejon (KR)

(73) Assignee: Electronics and Telecommunications Research Institute (KR)

( * ) Notice: Subject to any disclaimer, the term of this patent is extended or adjusted under 35 U.S.C. 154(b) by 1287 days.

(21) Appl. No.: 10/724,346

(22) Filed: Nov. 26, 2003

(65) Prior Publication Data
US 2004/0114552 A1    Jun. 17, 2004

(30) Foreign Application Priority Data

Nov. 27, 2002 (KR) .................. 10-2002-0074480

(51) Int. Cl.
*H04B 7/185* (2006.01)
*H04B 7/216* (2006.01)
*H04B 7/19* (2006.01)

(52) U.S. Cl. ................. 370/316; 370/320; 455/13.2

(58) Field of Classification Search .......... 370/316, 370/320, 342
See application file for complete search history.

(56) References Cited

U.S. PATENT DOCUMENTS

| | | | |
|---|---|---|---|
| 5,943,361 A | 8/1999 | Gilhousen et al. | |
| 6,222,828 B1 * | 4/2001 | Ohlson et al. | 370/320 |
| 6,317,412 B1 | 11/2001 | Natali et al. | |
| 6,396,826 B1 | 5/2002 | Ohlson et al. | |
| 6,483,553 B1 * | 11/2002 | Jung | 348/731 |
| 2002/0172180 A1 * | 11/2002 | Hall et al. | 370/342 |
| 2009/0186622 A1 * | 7/2009 | Karabinis | 455/446 |

OTHER PUBLICATIONS

"Advances in Satellite CDMA Transmission for Mobile and Personal Commumunication", R. Gaudenzi, et al., Proceedings of the IEEE, vol. 84, No. 1, Jan. 1996, p. 18-30.
"Satellite UMTS/IMT2000 W-CDMA Air Interfaces", P. Taaghol, et al., IEEE Communications Manager, Sep. 1999, pp. 116-126.
"The Globalstar Cellular Satellite System", F. Dietrich, et al., 1998 IEEE, pp. 935-942.

* cited by examiner

*Primary Examiner* — Patrick N Edouard
*Assistant Examiner* — Michael T Thier
(74) *Attorney, Agent, or Firm* — Blakely, Sokoloff, Taylor & Zafman

(57) ABSTRACT

Provided are a packet transmission method for transmitting packets in a forward link of a multibeam satellite communication system and a computer-readable recording medium for recording a program that implements the method. The packet transmission method transmitting packets to mobile stations in a forward link of a multibeam satellite communication system, comprising the steps of: wherein downlink beams of a satellite share an orthogonal spreading code set for transmitting packets to the mobile stations, a) generating downlink beam signals by using an identical structure for the radio frames transmitted through the downlink beams and an identical pseudo-noise (PN) scrambling code for generating downlink beam signals; and b) synchronizing transmission timings of frames, symbols and spread chips on the downlink beam signals.

15 Claims, 16 Drawing Sheets

-- Prior Art --

FIG. 2
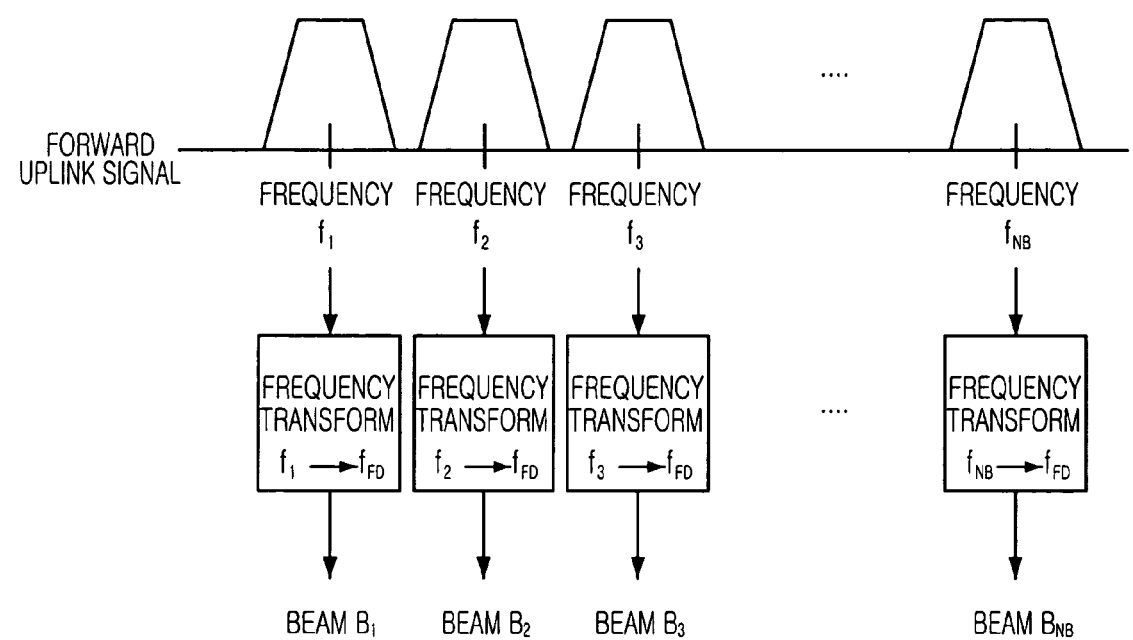
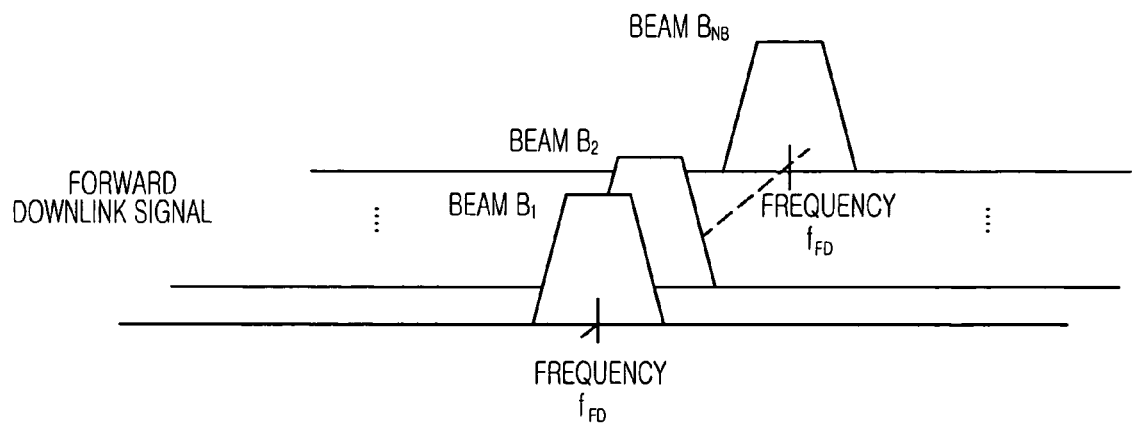

FIG. 11
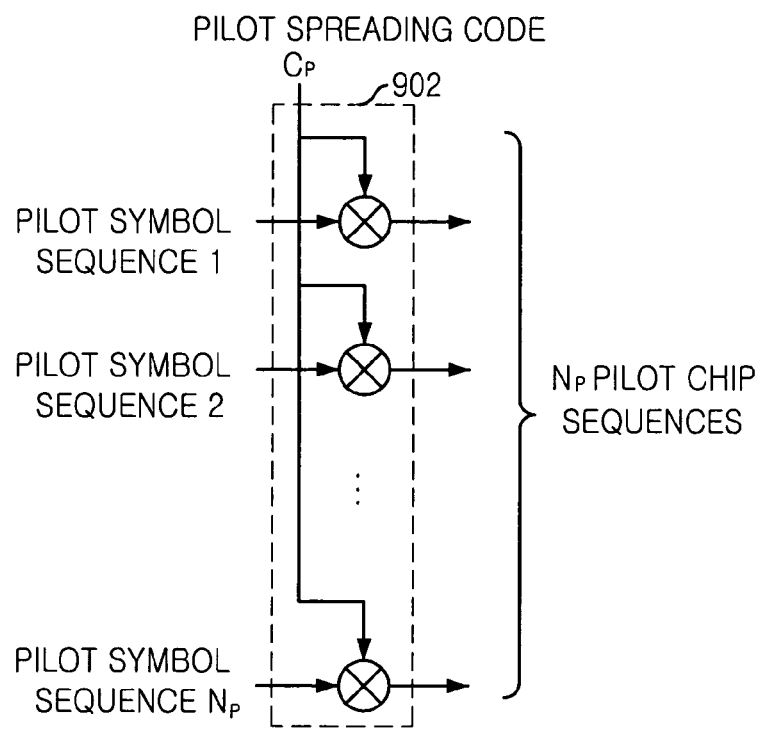
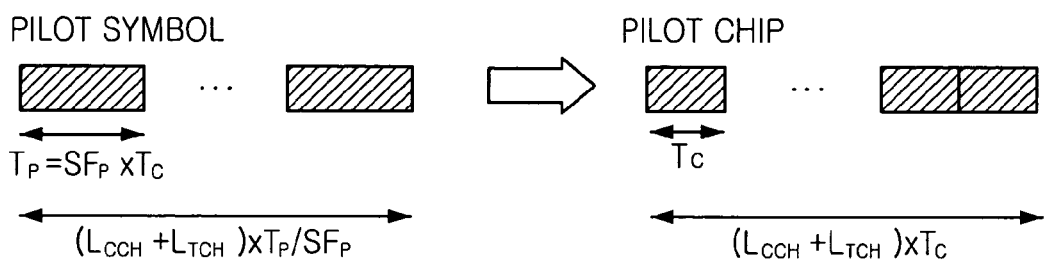

APPARATUS AND METHOD FOR TRANSMITTING PACKET IN FORWARD LINK OF MULTIBEAM SATELLITE COMMUNICATION SYSTEM

FIELD OF THE INVENTION

The present invention relates to an apparatus for transmitting packets in a forward link of a multibeam satellite communication system, a method thereof and a computer-readable recording medium for recording a program that implements the same method.

DESCRIPTION OF RELATED ART

FIG. 1 is a structural diagram showing a conventional satellite-based cellular communication system. As shown in the drawing, in the conventional satellite communication system a service area consists of a plurality of cells each of which is serviced by a satellite beam, as the terrestrial cellular mobile communication system using base stations. Communication links between the satellite and mobile stations are established by the satellite multibeam.

The satellite relays communication services between mobile stations and an earth station, and the earth station provides a connection to terrestrial networks, such as the Internet, with the mobile station. The earth station also play a role of central station which is to control the satellite network, such as establishment, maintenance and termination of connections to mobile stations through the satellite.

Packets from the terrestrial network is delivered to a user through a forward link connection of earth station-satellite-user, and packets from the user is delivered to the terrestrial network through a reverse link connection of user-satellite-earth station.

As the terrestrial cellular system, satellite systems using a Code Division Multiple Access (CDMA) and the same frequency band in all cells have been suggested.

Globalstar is a satellite communication system adopting the CDMA technology of the Interim Standard-95 (IS-95), which is used for the terrestrial second-generation mobile communication system. It is disclosed in a paper by Fred J. Dietrich, Paul Metzen and Phil Monte, "The Globalstar Cellular Satellite System," *IEEE Trans. on Antennas and Propagation*, Vol. 45, No. 6, pp.935-942, June 1998, which is incorporated herein as Reference 1.

Another satellite-based cellular mobile communication system is the Satellite-Universal Mobile Telecommunication System (Satellite-UMTS) using a technology similar to wideband-CDMA (W-CDMA) which is a radio transmission technology for the terrestrial third-generation mobile communication system. The Satellite-UMTS is disclosed in a paper by Payam Taaghol, Barry G. Evans, Enrico Buracchini, Riccardo De Gaudenzi, Gennaro Gallinaro, Joon Ho Lee and Chung Gu Kang, "Satellite UMTS/IMT-2000 W-CDMA Air Interface," *IEEE Communication Magazine*, pp.116-126, January 1999, which is incorporated herein as Reference 2.

As described above, the conventional satellite mobile communication system using the CDMA technology reuses the same frequency band in cells or beams for spectrum efficiency. It uses orthogonal spreading codes, such as Walsh code, to discriminate different user signals or physical channels within a cell or beam in the forward link. Pseudo-noise (PN) scrambling codes are used for discriminating signals from different cells in the forward link and from different users in the reverse link. For the forward link, it can reuse the orthogonal codes in each cell because each beam signal is discriminated by the PN code.

However, the non-orthogonality of the PN codes causes serious interference among the adjacent beams. Particularly, users around the cell boundary suffer even more serious interference.

To reduce the interference between beams, a solution is suggested in U.S. Pat. No. 6,317,412, entitled "Increased Capacity in an OCDMA System for Frequency Isolation. In the U.S. Pat. No. 6,317,412, it is recommended to use different frequency bands among adjacent beams and reuse the same frequency band according to a regular reuse pattern. However, the suggestion has a shortcoming that the overall spectrum efficiency of the system is dropped because the adjacent beams use different bands, as in case of general Time Division Multiple Access (TDMA) cellular systems.

The conventional satellite mobile communication system used a circuit-switching technology, and a physical channel is exclusively assigned to a user until the end of service. However, as the demand for Internet services is increasing, the data packet traffics is increasing, and thus it has a tendency to adopt a packet-switching technology that can enhance the system efficiency due to statistical multiplexing. Therefore, an access method suitable to the packet-switching is required. The conventional satellite mobile communication system using the circuit switching is not suitable to high-speed packet transmission with a high traffic burst.

SUMMARY OF THE INVENTION

It is, therefore, an object of the present invention to provide an apparatus for transmitting packets in a forward link of a multibeam satellite mobile communication system that can minimize the interference between beams and increase the system capacity by using the same pseudo-noise (PN) scrambling code and sharing a set of orthogonal spreading codes in all beams.

It is another object of the present invention to provide an method for transmitting a packet in a forward link of a multibeam satellite mobile communication system that can minimize the interference between beams and increase the system capacity by using the same PN scrambling code and sharing a set of orthogonal spreading codes in all beams.

It is another object of the present invention to provide a computer-readable recording medium for recording a program that can minimize the interference between beams and increase the system capacity by using the same PN scrambling code and sharing a set of orthogonal spreading codes in all beams of a satellite for the forward downlink.

In accordance with an aspect of the present invention, there is provided a method for transmitting packets to mobile stations in a forward link of a multibeam satellite communication system, including the steps of: wherein downlink beams of a satellite share an orthogonal spreading code set for transmitting packets to the mobile stations, a) generating downlink beam signals by using an identical structure for the radio frames transmitted through the downlink beams and an identical pseudo-noise (PN) scrambling code for generating downlink beam signals; and b) synchronizing transmission timings of frames, symbols and spread chips on the downlink beam signals.

In accordance with another aspect of the present invention, there is provided an apparatus for transmitting packets to a mobile station in a forward link of a multibeam satellite communication system, including: a first generation portion for generating synchronization sample sequence by using synchronization sequence and a scrambling code; a second generation portion for generating pilot chip sequences; a third generation portion for generating channel encoded and interleaved bit sequences to be transmitted through data subcarriers in a control subframe and a traffic subframe; a modulation and spreading portion for modulating the bit sequences generated by the third generation means into complex modulated symbols by using a modulation method and spreading the modulated symbols in one dimension of time or frequency or in two dimensions of time and frequency; a multiplexing and interlacing portion for multiplexing and interlacing the signals transmitted in the frequency slots and time slots in a frame; a frequency multiplexing portion for frequency-multiplexing the signals from the first and second generation means and the multiplexing and interlacing portion; a scrambling portion for scrambling the scrambling code with the output of the frequency multiplexing portion; a fourth generation portion for generating a multicarrier sample sequences; and a multiplexing portion for multiplexing the synchronous sample sequence generated by the first generation portion with the multicarrier sample sequence generated by the fourth generation portion.

In accordance with another aspect of the present invention, there is provided a method for transmitting packets to a mobile station in a forward link of a multibeam satellite communication system, including the steps of: a) selecting an active beam set by using the signal-to-interference-and-noise ratios (SINRs) of beam pilots which are reported from the mobile station and transmitting a message on the active beam set selection to the mobile station; and b) receiving data packets to be transmitted to the mobile station from terrestrial networks, selecting a service beam whose pilot SINR is largest among the reported pilot SINRS, and transmitting the control packet including a radio resource allocation message in the control subframe of the selected service beam and the data packets in the data subframe to the mobile station.

In accordance with another aspect of the present invention, there is provided a computer-readable recording medium provided with a microprocessor, for recording a program that implements a packet transmission method for transmitting packets to mobile stations in forward link of a multibeam satellite communication system, the packet transmission method including the steps of: a) selecting an active beam set by using the signal-to-interference-and-noise ratios (SINRs) of beam pilots which are reported from the mobile station and transmitting a message on the active beam set selection to the mobile station; and b) receiving data packets to be transmitted to the mobile station from terrestrial networks, selecting a service beam whose pilot SINR is largest among the reported pilot SINRS, and transmitting the control packet including a radio resource allocation message in the control subframe of the selected service beam and the data packets in the data subframe to the mobile station.

In the present invention, an orthogonal code set can be shared among beams by using the same PN scrambling code and the identical synchronized radio frames for all beams.

In the present invention, a multicarrier transmission is used and the downlink signal is transmitted through a plurality of subcarriers. A part of subcarriers are used for transmitting pilot signals that are helpful for mobile stations to receive the downlink signals from the satellite. The pilot subcarriers are spaced at a predetermined interval over the whole frequency band so that the mobile station performs the channel estimation on a frequency-selective fading channel. The pilot signal is a signal spread by a pilot code sequence unique to each beam.

In accordance with the present invention, mobile stations discriminate and receive each beam signal by using the pilot signal transmitted through the pilot subcarrier. The mobile stations measure the received signal-to-interference-and-noise ratio for each beam pilots and they are provided with packet transmission service from a beam having the highest pilot signal-to-interference-and-noise ratio.

BRIEF DESCRIPTION OF THE DRAWINGS

The above and other objects and features of the present invention will become apparent from the following description of the preferred embodiments given in conjunction with the accompanying drawings, in which:

FIG. 2 is a diagram illustrating a process of the satellite of FIG. 1 receiving a signal through a forward uplink and transmitting the signal to each beam through a forward downlink;

FIG. 11 is a detailed block diagram depicting the pilot chip sequence generation portion of FIG. 9 in accordance with an embodiment of the present invention;

DETAILED DESCRIPTION OF THE INVENTION

Figure 1:
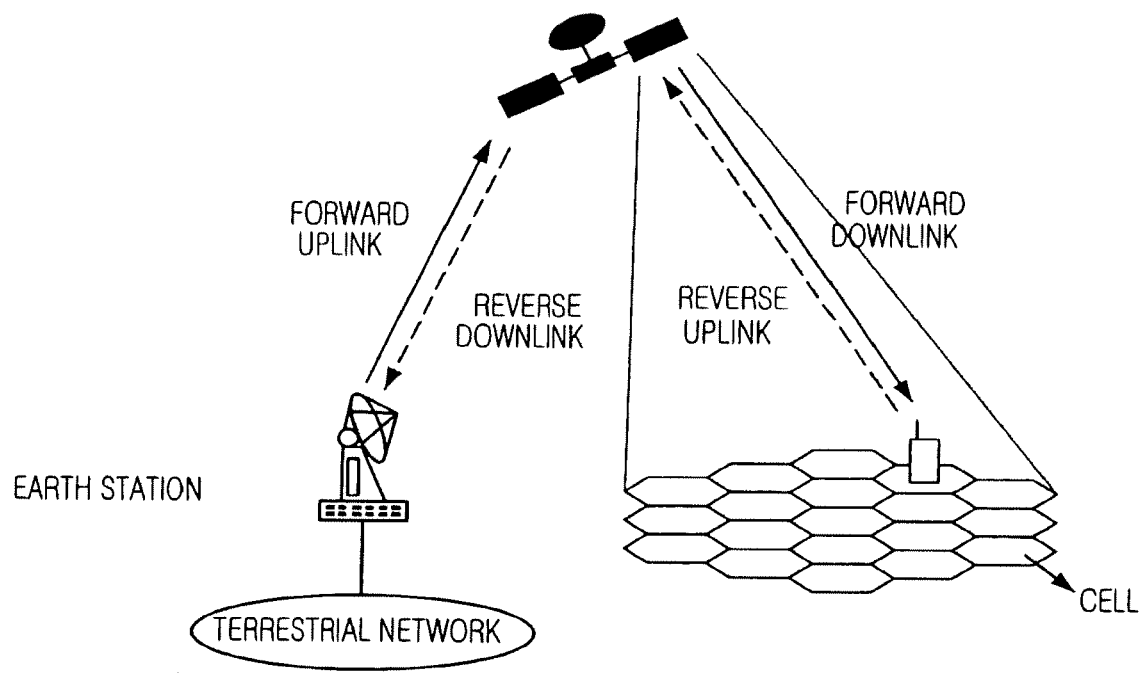
FIG. 1 is a structural diagram showing a typical cellular satellite communication system.

Other objects and aspects of the invention will become apparent from the following description of the embodiments with reference to the accompanying drawings, which is set forth hereinafter. Here, the same reference numeral is given to the same element, even though it appears in different drawings. Hereinafter, preferred embodiments of the present invention will be described in detail with reference to the accompanying drawings.

A data packet service, such as the Internet service, has a feature that forward link traffic transmitted from a network to a user are larger than reverse link traffic transmitted from a user to a network. The present invention focuses on the Internet service having such property and it is applied to the forward link where data packets are transmitted to a user through a satellite.

Referring to FIG. 1, a satellite communication system to which the apparatus and method of the present invention are applied will be described. In the drawing, packets generated in a terrestrial network are transmitted to a user through an earth station and a satellite.

If the satellite is incapable of processing baseband signals and simply performing frequency conversion, amplification and relay, a forward downlink signal transmitted from the satellite to the user is first generated in the earth station and transmitted to the satellite through a forward uplink from the earth station to the satellite.

To discriminate signals to be transmitted to different beams or cells in the forward uplink, signals for each beam are transmitted at different frequency bands in a frequency division method and transmitted to the satellite, as disclosed in Reference 1.

FIG. 2 is a diagram illustrating a process of the satellite of FIG. 1 receiving a signal through a forward uplink and transmitting the signal to each beam through a forward downlink. As shown in the drawing, when a satellite has $N_B$ beams to serve $N_B$ cells, signals are transmitted to the satellite through $N_B$ different frequency bands in the forward uplink. Then, the satellite converts the signals of the frequency bands into the signals at the identical central frequency $f_{FD}$, amplifies them, and sends them out to a user through a corresponding beam.

Generally, cells or beams of the forward downlink can use more than one frequency band. If all the beams are assumed to use $N_{CH}$ frequency bands, the earth station transmits signals to the beams through $N_{CH} \times N_B$ frequency bands in the forward uplink. Since the forward downlink signals are the signals transmitted from the same signal source, all the beam signals can be easily synchronized in the frequency and time domains.

In a terrestrial cellular Code Division Multiple Access (CDMA) system, such as the second-generation Interim Standard-95 (IS-95) or the third-generation Wideband CDMA (W-CDMA), cells are served by base stations located at different places. In this case, it is almost impossible that the signals transmitted from different cells should be synchronously received at all users in different locations. This is because the location of base stations is different, and the signals from the different base stations are received at the users with different propagation delays. Therefore, terrestrial systems cannot discriminate the signals from different base stations by using orthogonal spreading codes. The orthogonality between the orthogonal spreading codes can be expected only when the signals are synchronized. For this reason, the terrestrial systems discriminate them by using different pseudo-noise (PN) codes. Here, interference is caused between the signals from the different base stations because PN codes have a property of non-zero cross-correlation.

In a conventional satellite-based cellular system just as suggested in Reference 2, PN codes are used for discriminating the signals from different beams, and the different user signals in a beam are discriminated by orthogonal Walsh codes, as in the terrestrial system.

However, every user at different locations can receive the synchronized beam signals, if the beam signals transmitted from the same earth station or satellite are synchronized. Therefore, if the signals spread by orthogonal spreading codes, such as Walsh codes, for different beams are synchronized at frequency and time domains, the orthogonality is maintained even when the users receive the signals, regardless of the location of users. Thus, the interference between the beams can be minimized. In this case, the same PN code is used for the beam signals belonging to the same satellite, and since the same PN code is used, the orthogonality between the orthogonal codes is not lost.

If two or more satellites are used in a system, it becomes hard to synchronize the different satellite signals. So, the signals from different satellites are discriminated by using a different PN scrambling code for each satellite.

Generally, the number of orthogonal codes is limited. If a Walsh code has a chip length of L, the number of orthogonal codes is L. This means that the number of codes that can be used simultaneously in all beams is limited to L. To avoid this lack of codes, the orthogonal spreading codes should be reused in the beams located apart from the service beam. If the orthogonal spreading codes are allocated to users in a circuit switching method, the number of users simultaneously serviced becomes quite restricted, even though the spreading codes are reused in the beams apart.

However, instead of allocating a unique orthogonal spreading code to each user, if the users are allowed to use orthogonal codes only while a packet is transmitted substantially, and when there is no packet to be transmitted, let another users to use the orthogonal spreading codes, which is a packet switching method, the problem of orthogonal code shortage can be solved. Data packet service, such as the Internet service, has this feature of intermittent traffic.

In short, the present invention suggests a multicarrier CDMA system that makes orthogonal spreading codes shared among beams by synchronizing and transmitting the signals of all beams and has a frame structure that makes the orthogonal spreading codes also shared among users in the packet switching method.

Figure 3:
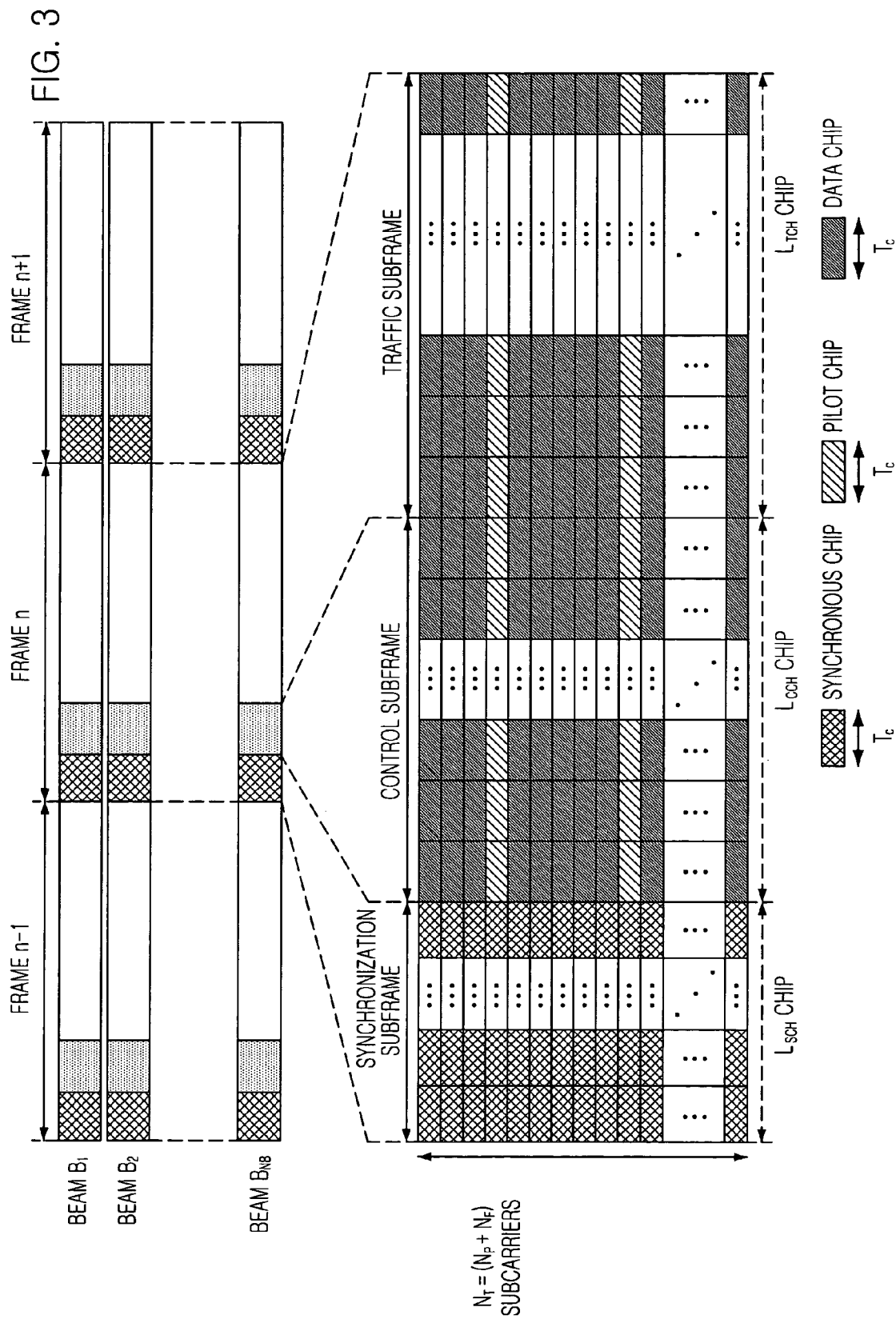
FIG. 3 is a diagram describing a structure of a forward link transmission frame in accordance with an embodiment of the present invention.

FIG. 3 is a diagram describing a structure of a forward link transmission frame in accordance with an embodiment of the present invention. As shown in the drawing, the signals from all beams, which are transmitted through the same satellite, are transmitted with the same frequency and the same frame, symbol, and chip timing. They also use the same PN scrambling code.

All frames have the same structure of synchronization subframe, control subframe and traffic subframe, and they have $N_T$ number of subcarriers in the frequency domain.

The length of chips transmitted from the subcarriers is $T_C$, and the frequency interval between the sub-arriers is $\Delta f = 1/T_C$.

In the synchronization subframe, the synchronous chip sequences having a predetermined pattern are transmitted at all the subcarriers. The synchronization chip sequences are the same in all beams.

The synchronization chip sequences are used to easily obtain the synchronization with downlink signals, when a mobile station first receives a signal of the system in order to establish a service. Using the synchronization chip sequences, the users can synchronize the starting points of the frames and estimate channel conditions on the downlink between the user and the satellite.

To acquire the downlink synchronization and estimate channel conditions, it is not necessary to discriminate the beams. Thus, the same synchronization chip sequence are used for all the beams and users receive a strongly integrated synchronous chip sequence from all the beams and perform a synchronization process easily, regardless of which beam the user belongs to, by using the synchronized identical chip sequence in all beams.

The control subframe is used for transmitting control packets, such as system information message, user paging message, and radio resource allocation message. The radio resource allocation message informs whether there is a packet transmitted to the user in the current frame, and if there is such packet, it informs which radio resources are used for transmitting the data packets in the current frame. The data packets are transmitted in the traffic subframe of the current frame.

Among $N_T(=N_P+N_F)$ subcarriers in the traffic subframe and the control subframe, $N_P$ subcarriers are used for transmitting the pilot signal unique to each beam.

Figure 4:
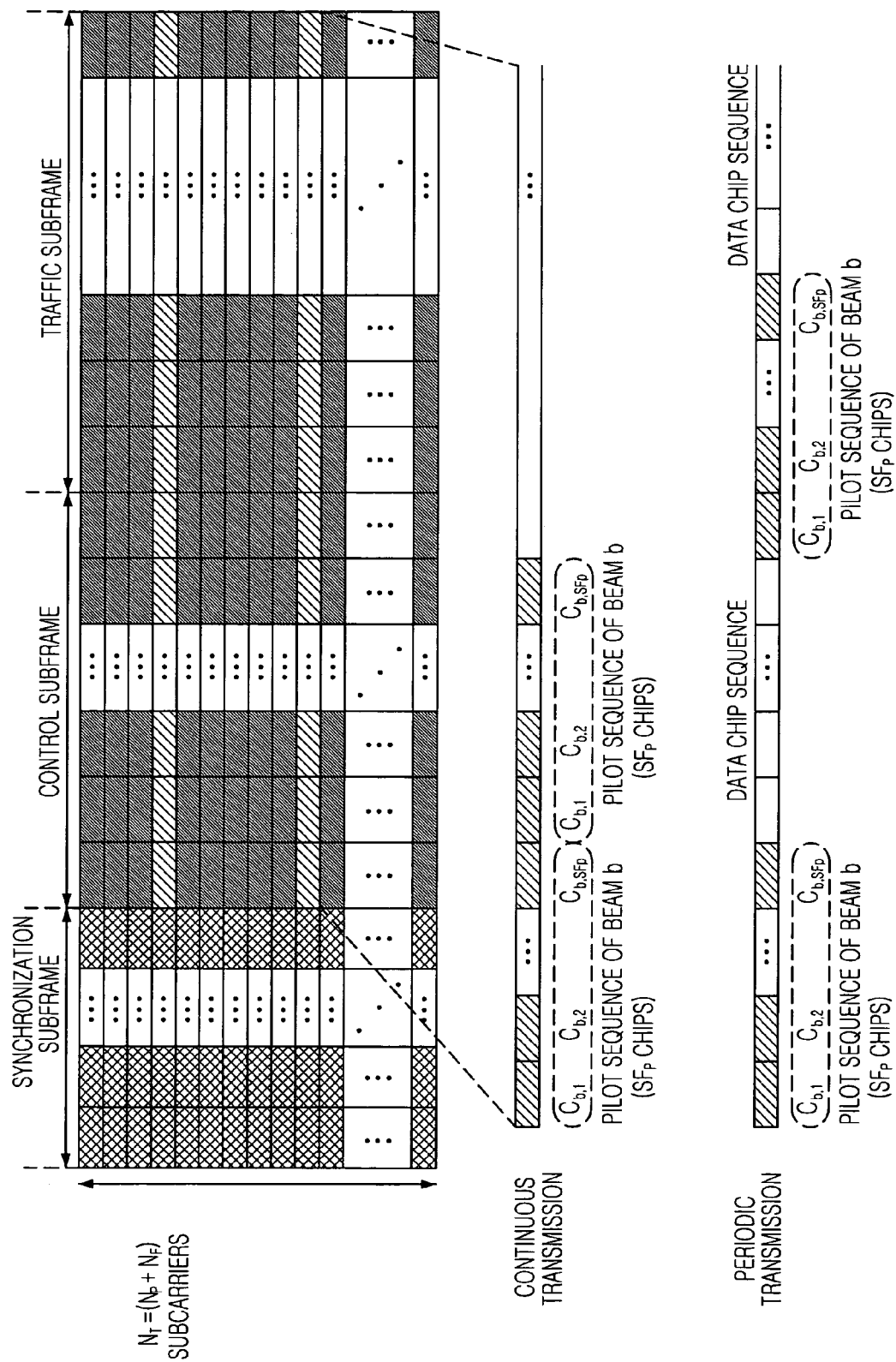
FIG. 4 is a diagram describing a structure of the pilot sequence of FIG. 3 in accordance with an embodiment of the present invention.

FIG. 4 is a diagram describing a structure of a pilot sequence of FIG. 3 in accordance with an embodiment of the present invention. The location of pilot subcarriers and the pilot symbol sequence are the same in all beams. However, as illustrated in the drawing, each beam can spread and transmit a predefined pilot symbol sequence by using a different pilot spreading code $C_{P,b}=<C_{p,b,1} C_{p,b,2}, \ldots, C_{P,b,SF_P}>$ (where b=1, 2, ... $N_B$) having a chip length of $SF_P$. That is, the pilot signal of each beam can be discriminated by the pilot spreading code.

A user, who enters the satellite communication system of the present invention for the first time, acquires the frame, chip, and frequency synchronization by using the synchronization chip sequence transmitted in the synchronization subframe. The user, then, detects the pilot chip sequences at the pilot subcarriers.

The user estimates and reports the received pilot signal powers to a center, which can be located at the earth station or the satellite, and a beam which has the strongest received pilot power is selected for the service to the user.

In addition to the purpose of the beam discrimination and selection, the pilot chip sequence is used for tracking the frequency and time synchronization on the forward signal received over $N_F$ data subcarriers and for performing the channel estimation for coherent demodulation.

When the length of a pilot spreading code is $SF_P$, the number of orthogonal spreading codes for beam pilots is also $SF_P$. If the number of pilot spreading codes is smaller than the number of beams, the pilot spreading codes can be reused in another beams apart, according to a predetermined reuse pattern.

Figure 5:
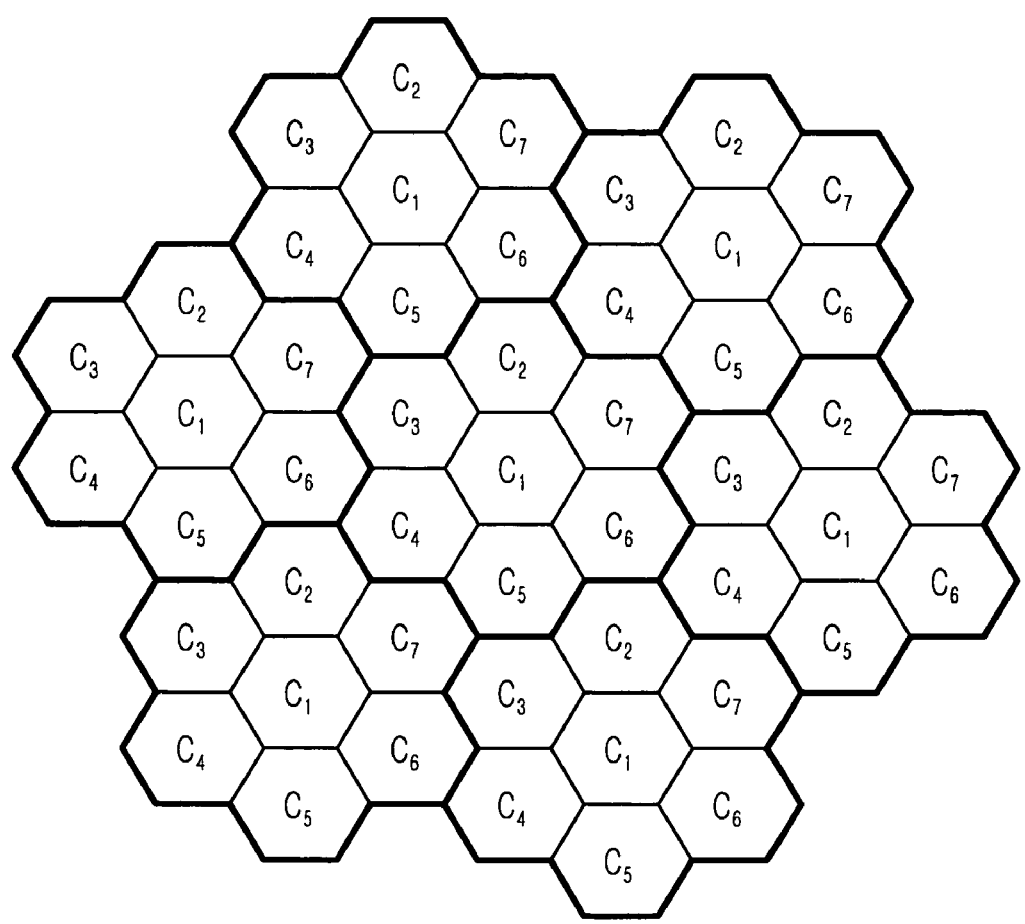
FIG. 5 is an exemplary diagram illustrating a case where a pilot spreading code is reused every seventh beam in accordance with an embodiment of the present invention.

FIG. 5 is an exemplary diagram illustrating a case where a pilot spreading code is reused every seventh beam in accordance with an embodiment of the present invention. As described in the drawing, the reuse of pilot spreading codes may adopt various reusing method such as the method of frequency reusing in terrestrial cellular mobile communication systems.

The number and length of pilot subcarriers are deeply related to the multipath delay spread of the satellite channel, as in the pilot symbol transmission for typical orthogonal frequency division multiplexing (OFDM) systems.

When it is assumed that the maximum delay spread caused by multipath propagation in the channel is $\tau_{max}$, the frequency interval $\Delta f_P$ of pilot subcarrier is set up to satisfy $\Delta f_P < 1/\tau_{max}$ generally.

Instead of the continuous transmission at the pilot subcarriers, the pilot chip sequences can be periodically transmitted, as shown in FIG. 4. In this case, one pilot chip sequence is continuously transmitted within a period, and the interval $\Delta \tau_P$ between the periodic sequences is set up to satisfy $\Delta \tau_P < 1/f_{D,max}$, where $f_{D,max}$ denotes the maximum Doppler spread of the channel.

In accordance with the present invention, one chip within a frame corresponds to one symbol in the OFDM system. In the OFDM system, one pilot symbol is transmitted periodically. In the system of the present invention, the length of the pilot symbol transmitted periodically is the same as the length of the pilot spreading code.

Figure 6:
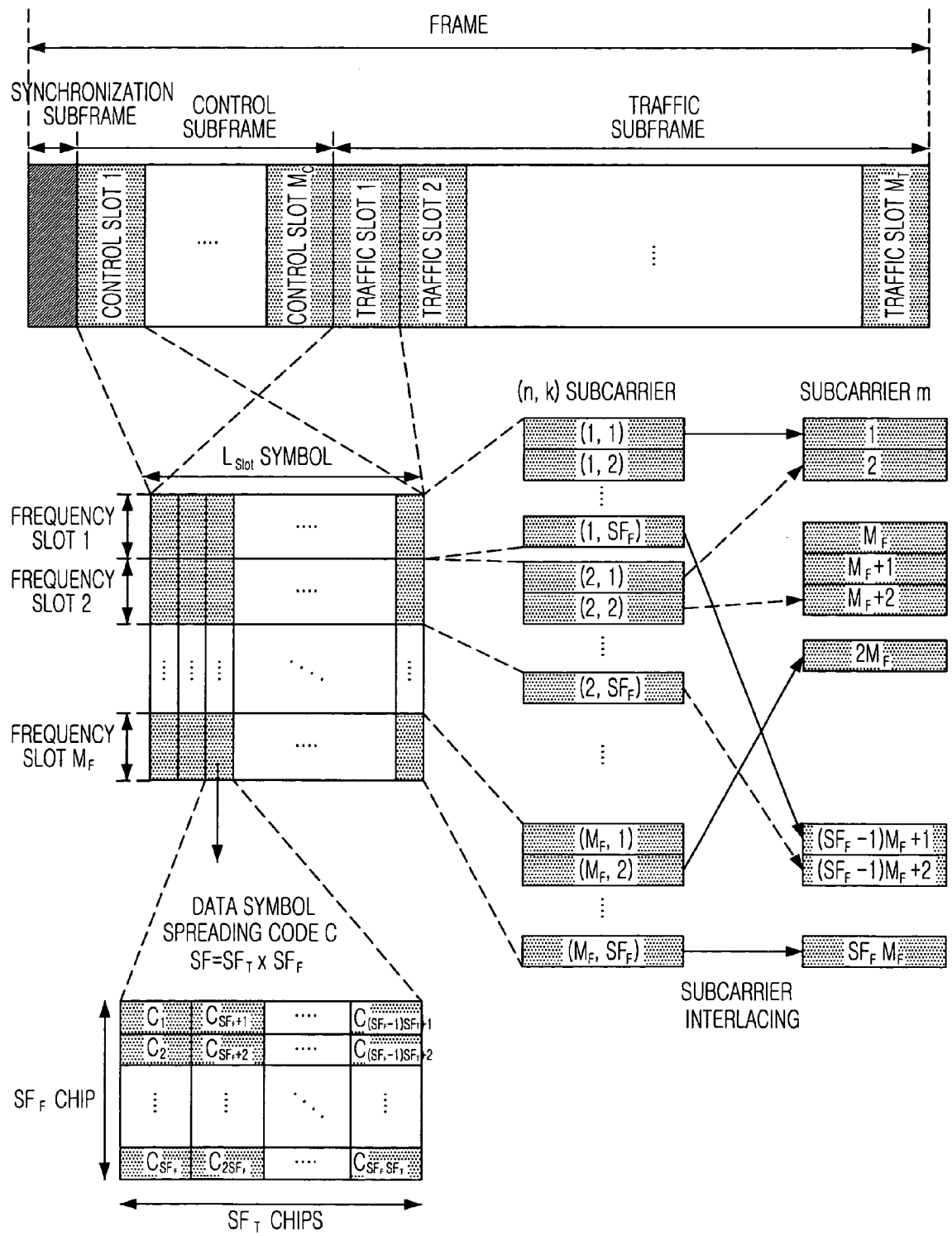
FIG. 6 is a detailed diagram illustrating a subcarrier interlacing and a time/frequency two-dimensional spreading of a data symbol in the control subframe and traffic subframe of FIG. 4, in accordance with an embodiment of the present invention.

FIG. 6 is a detailed diagram illustrating a subcarrier interlacing and a time/frequency two-dimensional spreading of a data symbol in the control subframe and the traffic subframe at FIG. 4, in accordance with an embodiment of the present invention. As shown in FIG. 6, the subframes are divided into time slots having a predetermined length that corresponds to the time duration of $L_{slot}$ data symbols.

In addition, the control subframe and the traffic subframe have $M_C$ and $M_T$ time slots, respectively.

One data symbol is formed of SF chips, which are obtained by spreading a modulated symbol in time and frequency domains by using an orthogonal spreading code $C=<C_1, C_2, \ldots, C_{SF}>$ of SF-chip length.

The spreading ratio SF is a multiplication of the spreading ratio $SF_T$ of direct spreading in the time domain and the spreading ratio $SF_F$ of frequency spreading over multicarrier in the frequency domain, as expressed in Equation 1, and thus, an orthogonal spreading code is formed of chips corresponding to the total spreading ratio SF.

$$SF = SF_T \times SF_F \qquad \text{Eq. 1}$$

A predetermined pilot symbol sequence for each pilot subcarrier is spread by the pilot spreading code unique to each beam and transmitted at each pilot subcarrier. On the contrary, one modulation symbol is transmitted, after being spread into a two-dimensional chip sequence of frequency and time over the data subcarriers in the control subframe and the traffic subframe. In addition, the length $SF_P$ of the pilot spreading code may be different from the length SF of the spreading code used for two-dimensional spreading of a data symbol.

Except for the $N_P$ pilot subcarriers among the $N_T$ subcarriers in the control subframe and the traffic subframe, the $N_F$ sub-carriers are used for the transmission of data symbols. The $N_F$ data subcarriers are grouped into $M_F$ subcarriers in each frequency slot. That is, $N_F = M_F \times SF_F$.

The number of subcarriers, $SF_F$, in each frequency slot is the same as the number of chips spread in the frequency domain, when one modulation symbol is spread into a plurality of chips by two-dimensional spreading of frequency/time.

The frequency spreading over $SF_F$ subcarriers in each frequency slot is performed to obtain frequency diversity in a frequency selective fading channel. To reduce the frequency correlation between the subcarriers in each frequency slot, the spacing between the subcarriers are widened as far as possible, as shown in FIG. 6. In the present invention, this process will be referred to as 'subcarrier interlacing'.

When the $SF_F$ data subcarriers belonging to the n-th frequency slot are referred to k=1, 2, . . . , $SF_F$, and total $N_F$ data subcarriers transmitted over the actual multicarrier are numbered in the order of m=1, 2, . . . , $N_F$, the relationship of a subcarrier k of the m-th frequency slot and a subcarrier m of the actual multicarrier is expressed in Equation 2 due to the subcarrier interlacing.

$$m=(k-1)M_F+n, (n=1, 2, \ldots, M_F, k=1, 2, \ldots, SF_F, \\ m=1, 2, \ldots, N_F) \quad \text{Eq. 2}$$

In typical mobile communication systems, data bits are encoded by an error correction code and interleaved so that a burst error caused by multipath fading could be corrected by the error correction code.

In case of a system where a frame is divided into time slots and the slots are shared by the users (i.e., Time Division Multiplexing (TDM)) to obtain a statistical multiplexing gain for packet transmission, a packet, which consists of the encoded and interleaved bit sequences, is transmitted in one or more time slots, according to the system's allocation. In this case, a deep fading may happen in the whole used slot or slots and a time correlation of the fading over the used slots is higher than that over the entire frame.

The present invention suggests a method of dispersing the symbols in a time slot evenly over the entire frame in order to reduce the fading correlation between the symbols within a packet when a packet is transmitted in a TDM fashion.

In addition to the subcarrier interlacing for transmitting the chips of one data symbol over subcarriers having a frequency spacing in order to obtain frequency diversity, the present invention takes the data symbols in one time slot apart as much as possible within a frame in order to obtain temporal and spatial diversity.

This process will be referred to 'symbol interlacing' in the present invention.

However, it is noted that the symbol interlacing is different from the subcarrier interlacing in a point that it does not put chip sequences, which composes one data symbol, apart but it put apart a plurality of data symbols which belong to one slot on a symbol basis.

Figure 7:
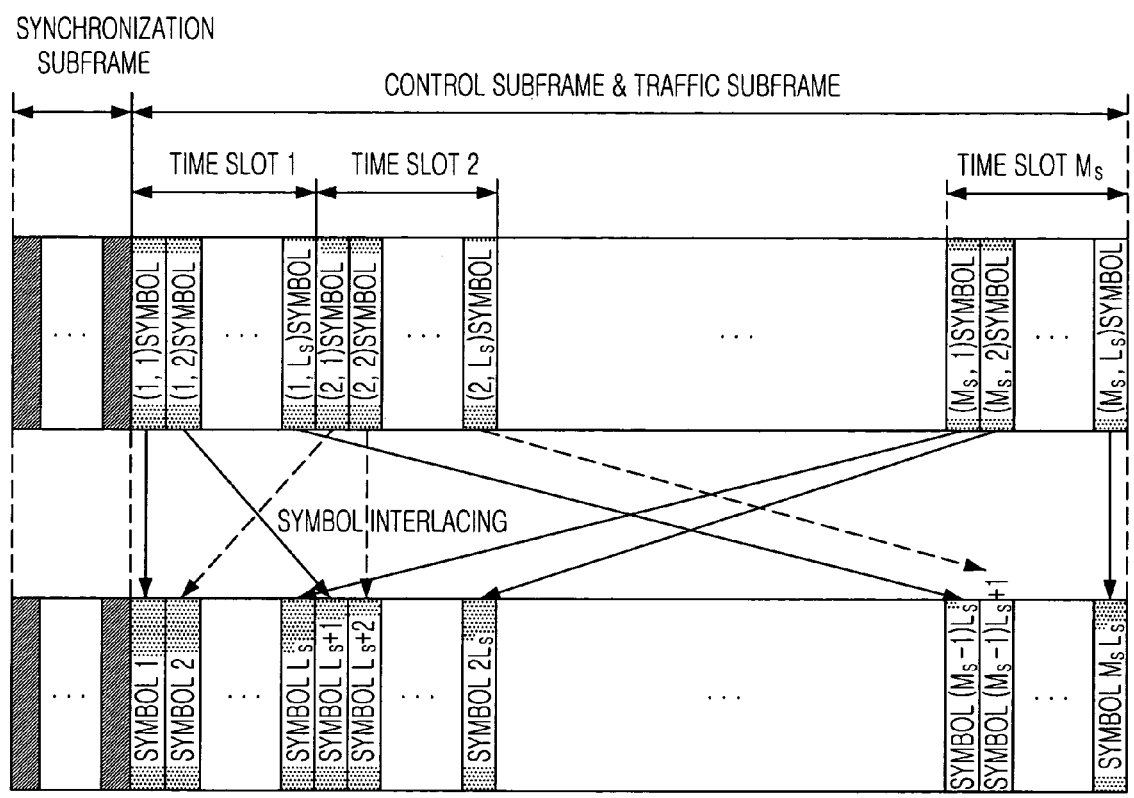
FIG. 7 is a detailed diagram describing a symbol interlacing in the control subframe and traffic subframe of FIG. 4 in accordance with an embodiment of the present invention.

FIG. 7 is a detailed diagram describing the symbol interlacing in the control subframe and the traffic subframe of FIG. 4 in accordance with an embodiment of the present invention.

The synchronization chips in the synchronization subframe and the chip sequences of pilot subcarriers in the control subframe and the traffic subframe are transmitted without the symbol interlacing process. The symbol interlacing is applied only to the symbol sequences transmitted through the data subcarrier in the control subframe and the traffic subframe.

When the number of time slots in the two subframes is $M_S(=M_C+M_T)$, and the k'-th symbol of the n'-th time slot is transmitted at the m'-th symbol after the synchronization subframe by the symbol interlacing process, the symbol number m' satisfies the following Equation 3.

$$m'=(k'-1)M_S+n', (n'=1, 2, \ldots, M_S, k'=1, 2, \ldots, L_S, \\ m'=1, 2, \ldots, M_S \times L_S \quad \text{Eq. 3}$$

As shown above, the control subframe and the traffic subframe, which are used to transmit a control packet and/or data packet, can be divided into radio resource units in three dimensions of time slots, frequency slots, and spreading codes, in accordance with the present invention.

Figure 8:
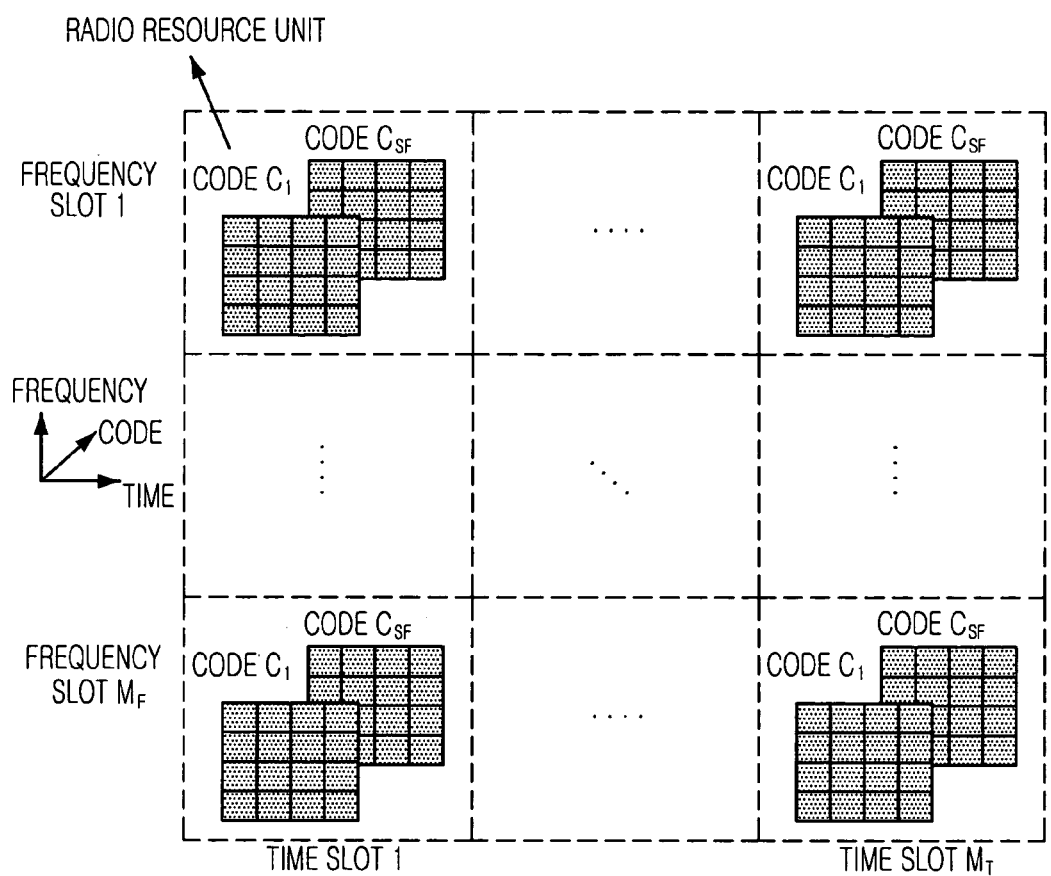
FIG. 8 is a structural diagram illustrating the control subframe and traffic subframe of FIG. 4 divided in three-dimensional in accordance with an embodiment of the present invention.

Hereinafter, the present invention will be described more in detail with reference to FIG. 8. FIG. 8 is a structural diagram illustrating the control subframe and the traffic subframe of FIG. 4 divided in three-dimensional radio resource units in accordance with an embodiment of the present invention.

As illustrated in the drawing, the radio resources of a frame are divided in time division multiplexing (TDM), frequency division multiplexing (FDM), and code division multiplexing (CDM), and shared by users. This division is performed only for data transmission, and the pilot subcarriers are out of this division process.

a radio resource unit is defined by a time slot, a frequency slot and an orthogonal spreading code, and one or more resource units are used to transmit a packet.

A control packet transmitted from the control subframe is spread by a unique orthogonal code allocated to each beam and transmitted. Different control spreading codes are used in the adjacent beams, and the same control spreading code can be reused in beams far apart.

One or more codes may be grouped and allocated as a control spreading code set to each beam. There is one-to-one relationship between the control spreading code set and the pilot spreading code for each beam and thus, a user can know which control spreading codes are used for a beam by detecting the pilot spreading code used for the beam.

The control packets from different beams, which are transmitted over the same subcarriers at the same time slot can be discriminated by the control spreading code used in each beam.

Unlike the use of the pilot spreading code and the control spreading code, which is uniquely allocated to each beam, the traffic spreading code CT that is used for the transmission of data packet in the traffic subframe is not allocated to a particular beam or user fixedly, but newly selected for every packet transmission.

The time slot, frequency slot, and spreading code that are used for transmitting a packet to a user is informed the user by the radio resource allocation message transmitted in the control subframe.

With reference to FIGS. 9 through 14, the apparatus for transmitting the forward link frame having the structure described above will be described in detail.

Figure 9:
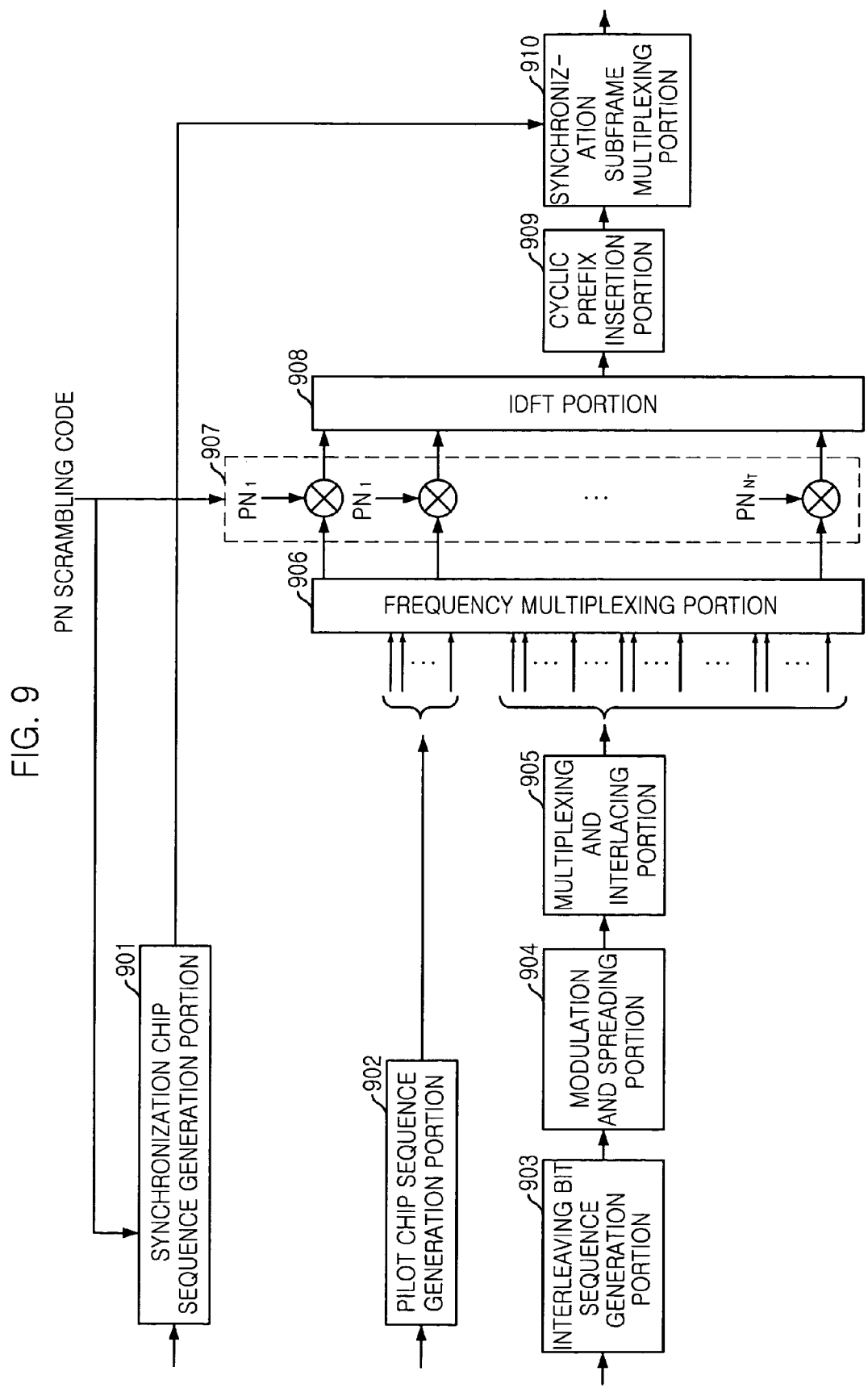
FIG. 9 is a block diagram depicting a packet transmission apparatus in the forward link of a multibeam satellite communication system in accordance with an embodiment of the present invention.

FIG. 9 is a block diagram depicting a packet transmission apparatus in the forward link of a multibeam satellite communication system in accordance with an embodiment of the present invention. As illustrated in the drawing, the packet transmission apparatus of the present invention includes a synchronization chip sequence generation portion 901, a pilot chip sequence generation portion 902, an interleaved bit sequence generation portion 903, a modulation and spreading portion 904, a multiplexing and interlacing portion 905, a frequency multiplexing portion 906, a scrambling code multiplying portion 907, an inverse discrete Fourier transform portion 908, a cyclic prefix insertion portion 909 and a synchronization subframe multiplexing portion 910.

Figure 10:
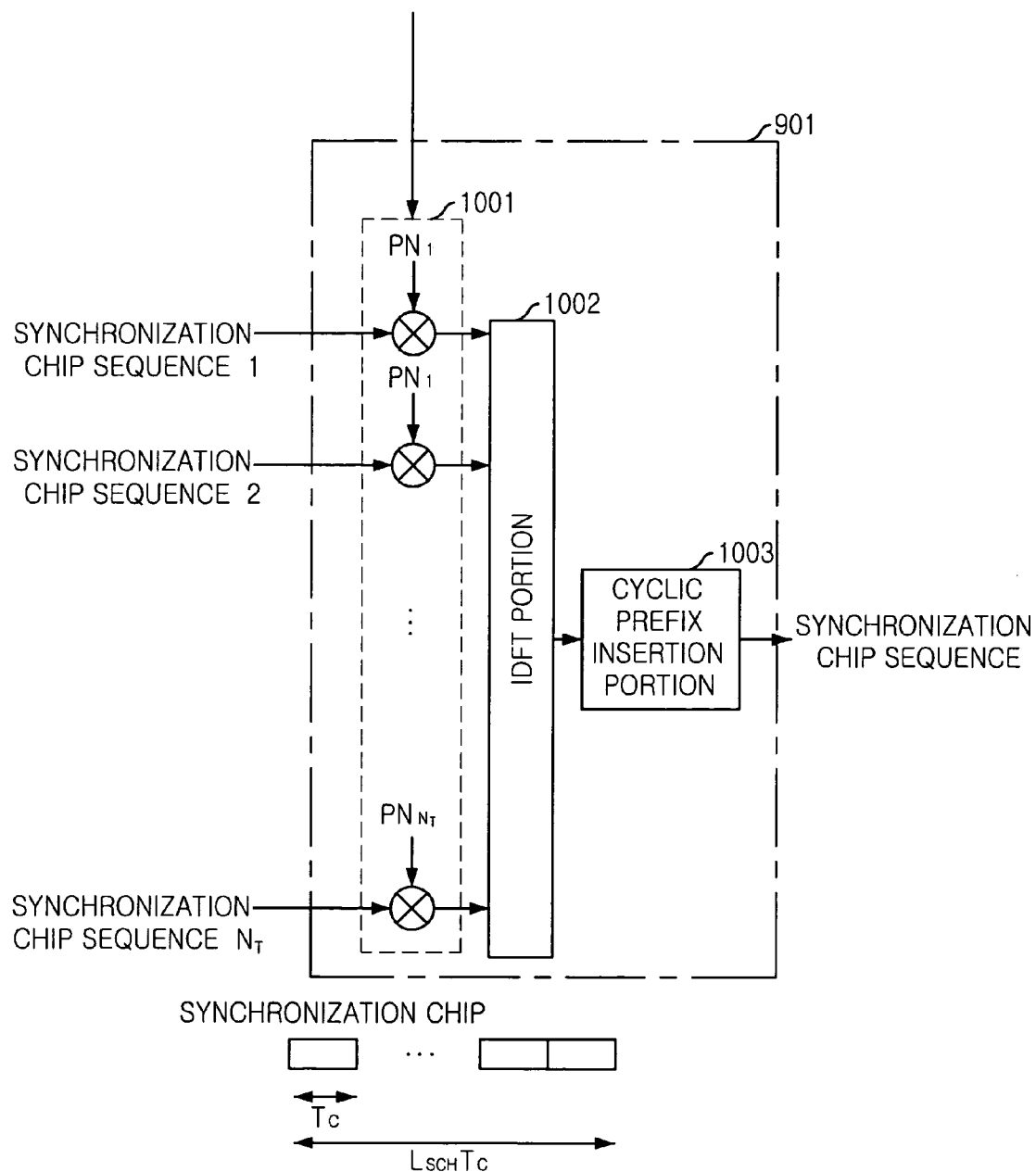
FIG. 10 is a detailed block diagram depicting the synchronous sample sequence generation portion of FIG. 9 in accordance with an embodiment of the present invention.

The synchronization chip sequence generation portion 901 generates a sample sequence for the synchronization subframe. Referring to FIG. 10, the synchronization chip sequence generation portion 901 will be described more in detail. FIG. 10 is a diagram depicting the synchronization sample sequence generation portion of FIG. 9 in accordance with an embodiment of the present invention. It describes a process of generating a synchronization sample sequence which is transmitted through the whole $N_T(=N_P+N_F)$ subcarrier in the synchronization subframe located at the beginning part of a frame.

As shown in the drawing, the synchronous chip sequence generation portion 901 includes a scrambling code multiplying portion 1001, an inverse discrete Fourier transform portion 1002 and a cyclic prefix insertion portion 1003. A synchronization chip sequence is composed of LSCH chips at each subcarrier and has a chip rate of $1/T_C$, where $T_C$ is a chip duration.

The scrambling code multiplying portion 1001 multiplies a pseudo-noise (PN) scrambling code, to $N_T$ parallel synchronization chip sequences. Here, a scrambling code consists of $N_T$ chips (i.e., $PN=PN_1, PN_2, \ldots, PN_{N_T}$). All beams of a satellite use the same scrambling code.

A scrambling code may be selected as a code that can minimize a peak to average power ratio (PAPR) of a signal. A high PAPR causes a signal distortion when a non-linear amplifier is used.

The inverse discrete Fourier transform portion 1002 performs Inverse Discrete Fourier Transform (IDFT) at every chip time. The cyclic prefix insertion portion 1003 inserts a cyclic prefix in the beginning part of the sample sequence generated by the IDFT at every chip time so as to avoid inter-chip interference caused by the multipath propagation in the channel.

The synchronization chip sequence, which is an input of the synchronous chip sequence generation portion 901, may be pre-defined in a system in consideration of low PAPR and the efficient synchronization at the mobile station.

The pilot chip sequence generation portion 902 generates a pilot chip sequence which is transmitted through $N_P$ pilot subcarrier in the control subframe and the traffic subframe of FIG. 3.

FIG. 11 is a detailed block diagram depicting the pilot chip sequence generation portion of FIG. 9 in accordance with an embodiment of the present invention. As shown in the drawing, Pilot symbol sequences, which are input to the pilot chip sequence generation portion 902 and transmitted through the pilot subcarriers, should be constructed to have a low PAPR property and to easily acquire the frequency and time synchronization and perform channel estimation, when they are transformed into multicarrier signal.

The $N_P$ parallel symbol sequences transmitted at each pilot subcarrier are spread by the same beam pilot spreading code $C_P$ for every pilot subcarriers. The symbol rate of the pilot symbol sequence at each pilot subcarrier is $1/T_P=1/(T_C \times SF_P)$, and each pilot symbol is spread into $SF_P$ chips. So, the chip rate at each pilot subcarrier becomes $1/T_C$.

The spread pilot chip sequence consists of $L_{CCH}+L_{TCH}$ chips, which corresponds the chip length of the control subframe and the traffic subframe.

The interleaved bit sequence generation portion 903 of FIG. 9 generates an interleaved bit sequence which is transmitted at the data subcarriers in the control subframe or the traffic subframe.

Figure 12:
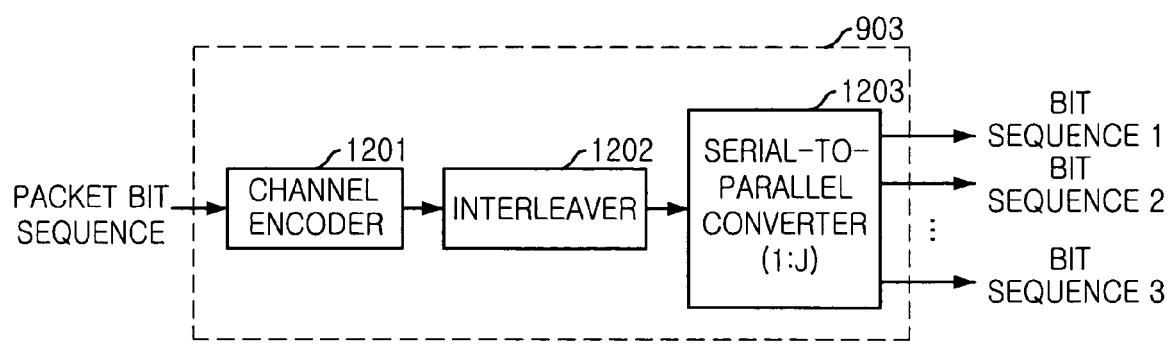
FIG. 12 is a detailed block diagram depicting the channel encoded and interleaved bit sequence generation portion of FIG. 9 in accordance with an embodiment of the present invention.

FIG. 12 is a detailed block diagram depicting the interleaved bit sequence generation portion of FIG. 9 in accordance with an embodiment of the present invention. As illustrated in the drawing, the interleaved bit sequence generation portion 903 includes a channel encoder 1201, an interleaver 1202 and a serial-to-parallel converter 1203. In accordance with the present invention, a control packet or data packet is transmitted by one or more radio resource units, each being defined by a specific time slot, a specific frequency slot, and a specific spreading code, according to system's allocation.

First, the channel encoder 1201 performs a channel encoding on the data bit sequence consisting of packets. The interleaver 1202 interleaves the channel-encoded data bit sequence. A plurality of time/frequency slots can be allocated for the packet. If J radio resource units are used for the packet transmission, the interleaved bit sequence is separated into J parallel bit sequences by the serial-to-parallel converter 1203.

The modulation and spreading portion 904 modulates and spreads the interleaved bit sequences that are transmitted simultaneously by different spreading codes in a time slot and a frequency slot.

Figure 13:
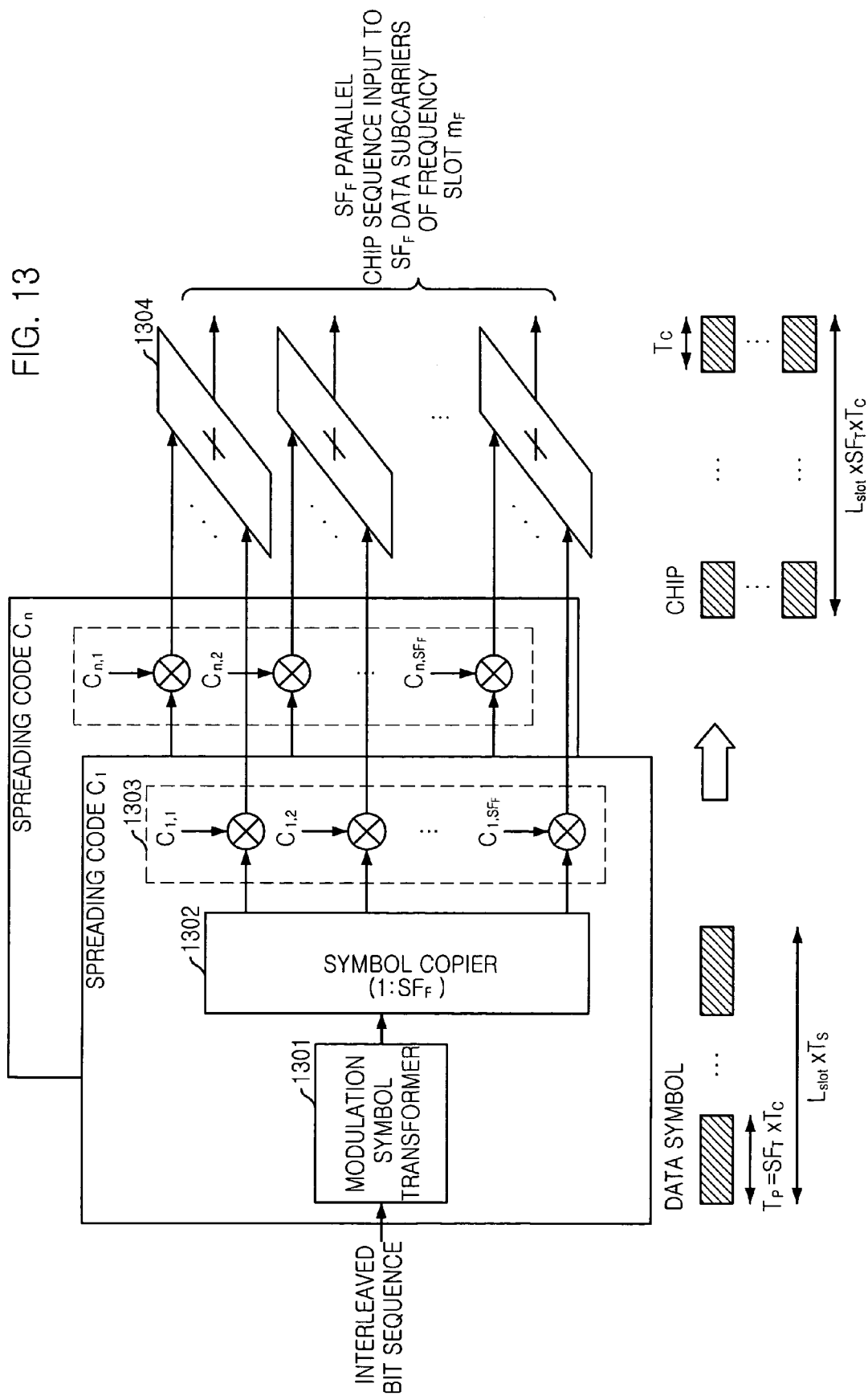
FIG. 13 is a detailed block diagram depicting the modulation and spreading portion of FIG. 9 in accordance with an embodiment of the present invention.

FIG. 13 is a detailed block diagram depicting the modulation and spreading portion of FIG. 9 in accordance with an embodiment of the present invention. As shown in the drawing, the modulation and spreading portion 904 includes a plurality of modulation symbol transformers 1301, a plurality of symbol copiers 1302, a plurality of spreading code multipliers 1303 and a plurality of parallel chip sequence combiners 1304. In a branch for each spreading code, a modulation symbol transformer 1301, a symbol copier 1302, and a spreading code multiplier 1303 are included.

The modulation symbol transformer 1301 transforms the interleaved bit sequences into complex modulated symbol sequences based on a M-ary phase shift keying (PSK) or M-ary quadrature amplitude modulation (QAM) selected for the packet transmission of a. The symbol copier 1302 duplicates a modulated symbol onto $SF_F$ parallel symbols to spread it over $SF_F$ subcarriers.

The spreading code multiplier 1303 spreads the modulated symbol which is duplicated in parallel by using the spreading code for each branch. The spreading code $C_n$ having a chip length of SF is divided into $SF_F$ sequences, each having a length of $SF_T$, for time/frequency two-dimensional spreading. The spreading code can be expressed by Equation 4.

$$C_n = <C_{n,1}, C_{n,2}, \ldots, C_{n,SF_F}> = <C_1, C_2, \ldots, C_{SF}> \qquad \text{Eq. 4}$$

where the codes for $SF_F$ subcarrier are:

$$C_{n,1} = <C_{n,1}, C_{n,2}, \ldots, C_{n,SF_T}>,$$

$$C_{n,2} = <C_{n,SF_T+1}, C_{n,SF_T+2}, \ldots, C_{n,2SF_T}>, \text{ and}$$

$$C_{n,SF_T} = <C_{n,(SF_F-1)SF_T+1}, C_{n,(SF_F-1)SF_T+2}, \ldots, C_{n,SF}>$$

In FIG. 12, the rate of the modulated symbol before spreading is $1/T_S = 1/(T_C \times SF_T)$, and the rate of chip sequence after spreading is $1/T_C$.

In the present invention, bit sequences for different packets can be transmitted simultaneously by different orthogonal spreading codes in the same time/frequency slot. When the bit sequences are transmitted by n different spreading codes in the same time/frequency slot and there are $SF_F$ parallel chip sequences for each spreading codes, the parallel chip sequence combiner 1304 adds up n parallel chip sequences for each of $SF_F$ subcarriers.

When the length of a time slot corresponds to the length of $L_{slot}$ symbols, a time slot has a chip length of $L_{slot} \times T_S (=L_{slot} \times T_C \times SF_T)$. After the modulated symbol is spread by the spreading code, $SF_F$ parallel chip sequences, each having $L_{slot} \times SF_T$ chips, are generated.

The multiplexing and interlacing portion 905 multiplexes and interlaces the chip sequences, which are generated by the modulation and spreading portion 904, for frequency and time slots in a frame.

Figure 14:
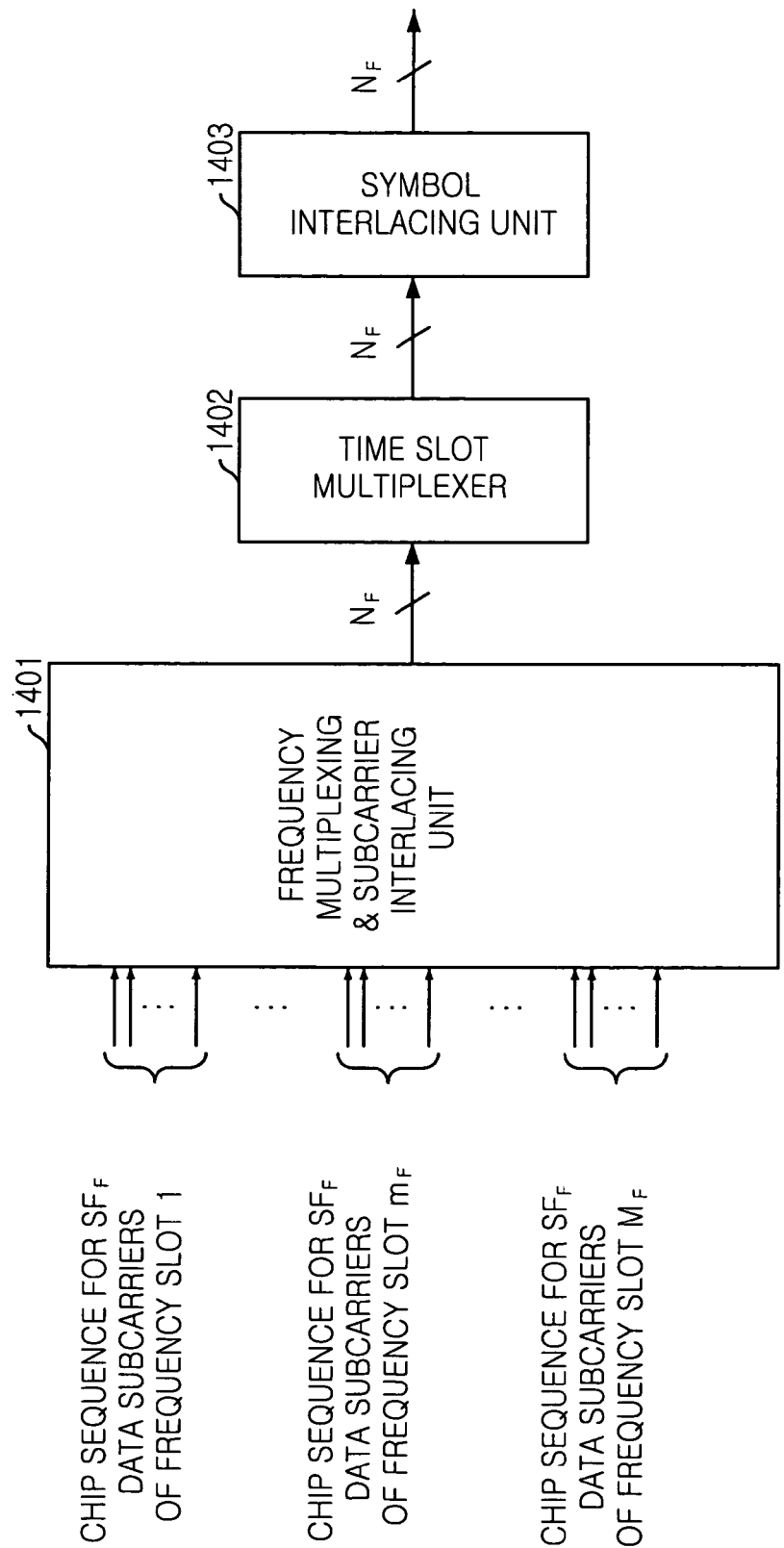
FIG. 14 is a detailed block diagram depicting the multiplexing and interlacing portion of FIG. 9 in accordance with an embodiment of the present invention.

Hereinafter, the multiplexing and interlacing portion 905 will be described more in detail, with reference to FIG. 14. FIG. 14 is a detailed block diagram depicting the multiplexing and interlacing portion of FIG. 9 in accordance with an embodiment of the present invention. As described in the drawing, the multiplexing and interlacing portion 905 includes a frequency multiplexing and subcarrier interlacing unit 1401, a time slot multiplexing unit 1402 and a symbol interlacing unit 1403.

The frequency multiplexing and subcarrier interlacing unit 1401 performs a frequency multiplexing and a subcarrier interlacing on $N_F$ chip sequences which are transmitted at $N_F$ subcarriers over $M_F$ frequency slots. The frequency multiplexing and subcarrier interlacing unit 1401 generates $N_F$ parallel chip sequences each of which have a chip length of $L_{slot} \times SF_T$ in each time slot. The frequency multiplexing and subcarrier interlacing is performed as described in FIG. 6.

The time slot multiplexing unit 1402 multiplexes the chip sequences for $M_T$ time slots, and generates $N_F$ parallel chip sequences having a chip length of $M_T \times L_{slot} \times SF_T$. The generated chip sequences are to be transmitted at $N_F$ data subcarriers in the control subframe and the traffic subframe.

The symbol interlacing unit 1403 performs a symbol interlacing on the multiplexed chip sequences. The symbol interlacing, which is described in FIG. 7, puts the symbols belonging to a time slot apart over a frame, where a symbol means $N_F$ parallel chip sequences, each having a chip length of $SF_T$ chips. That is, the symbol interlacing is performed on a symbol basis, and each symbol has a chip length of $SF_T$ and includes $N_F \times SF_T$ chips.

The frequency multiplexing portion 906 performs frequency multiplexing on the data chip sequences generated from the multiplexing and interlacing portion 905 and the pilot chip sequences generated from the pilot chip sequence generation portion 902.

The scrambling code multiplying portion 907 multiplies a PN scrambling code to $N_F$ chip sequences every chip time. The PN scrambling code is identical to the scrambling code used for the synchronization chip sequence generation portion 901.

The IDFT portion 908 generates a sample sequence for multicarrier transmission.

The cyclic prefix insertion portion 909 inserts a cyclic prefix in the beginning part of a frequency-transformed sample sequence in each chip duration to avoid the inter-chip interference due to the multipath propagation.

Finally, the synchronization subframe multiplexing portion 910 multiplexes the multicarrier sample sequence to be transmitted in the synchronization subframe, which has a length of $L_{SCH}$ chips and is generated by the synchronization chip sequence generation portion 901, with the multicarrier sample sequence to be transmitted in the control subframe and the traffic subframe, which has a length of $L_{CCH}+L_{TCH}$ chips and is generated by the cyclic prefix insertion portion 909. The portion 910 generates a multicarrier sample sequence for one frame, which has a length of $L_{SCH}+L_{CCH}+L_{TCH}$ chips.

The multicarrier sample sequence generated by the synchronization subframe multiplexing portion 910 is transmitted through a radio frequency (RF) block (not shown) and an antenna (not shown).

According to the present invention, the radio resource units in the traffic subframe are dynamically allocated to beams and users. To reuse the radio resources, the data packets transmitted to users who belong to different beams can be transmitted in the same frame time by using the same time slot, the same frequency slot and the same spreading code.

In this case, the same radio resource can be reused in beams sufficiently apart so that the interference between beams using the same radio resource unit should be under a certain level and thus, each user could receive a packet successfully.

When the ratio of the average received power of a packet transmitted for user u and the total interference power generated from another beams is $\gamma$, the same radio resource unit can be reused in beam b only when the ratio $\gamma$ is larger than a particular threshold value $\gamma^*$, as in Equation 5.

$$\gamma = P_{b,u} \bigg/ \sum_{\substack{X=0 \\ X \neq b}}^{N_B} I_X > \gamma^* \qquad \text{Eq. 5}$$

where $P_{b,u}$ denotes an average received power of a packet transmitted from beam b to a user u;

$I_x$ denotes the interference power generated by a packet transmitted from beam x by using the same radio resource unit; and $\gamma^*$ denotes a specific threshold value for determining the reuse of the same radio resource unit.

Figure 15:
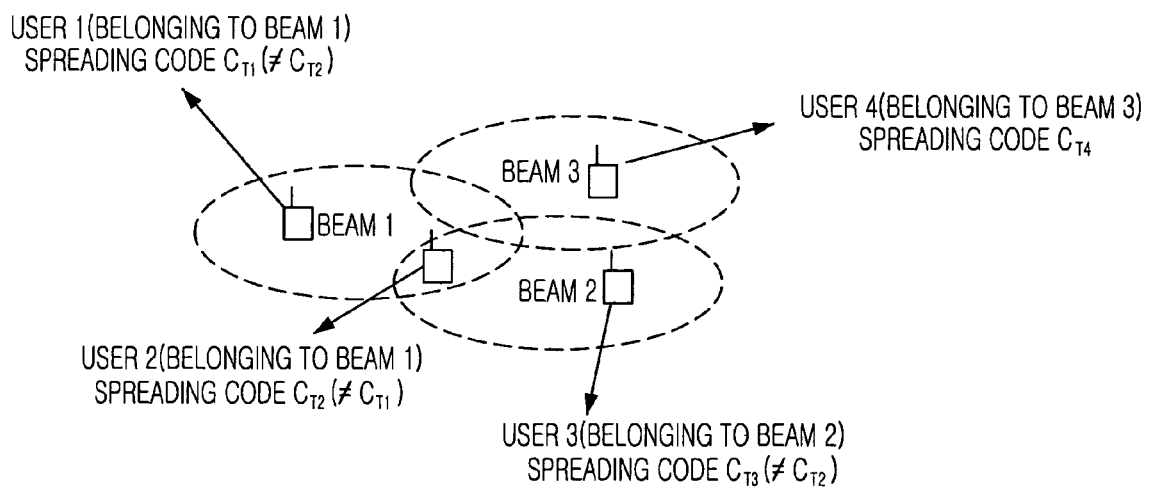
FIG. 15 is a diagram describing the allocation of orthogonal spreading code for packet transmission in accordance with an embodiment of the present invention.

FIG. 15 is a diagram describing the allocation of orthogonal spreading code for packet transmission in accordance with an embodiment of the present invention. The dotted circle is a service coverage zone of each beam. For the sake of convenience in description, it is assumed that the interference from a beam to adjacent beams is negligible and thus, the same code could be used.

When a spreading code $C_{T1}$ is used to transmit a packet to user 1 who belongs to beam 1, a packet for user 2 served by the beam 1, which is in the same time/frequency slot, should be transmitted by using a spreading code different from that of the user 1, because the user 2 belongs to the same beam coverage as the user 1.

In case of a packet for user 3 serviced by beam 2, the user 1 may be interfered, but the user 2 may not be interfered. Accordingly, the packet for the user 3 is transmitted by using another spreading code $C_{T3}$ ($C_{T3} \neq CT_2$), which is different from the spreading code used for the user 2. The code for the user 1 can be reused as one for the user 3.

Also, the user 4 who belongs to beam 3 can be interfered by the beams 1 and 2. So, he can use another spreading code $C_{T4}$ or the same spreading code used for another users.

As described above, the system spectral efficiency can be enhanced by re-using the radio resource in a beam that are not interfered by the adjacent beams.

Figure 16:
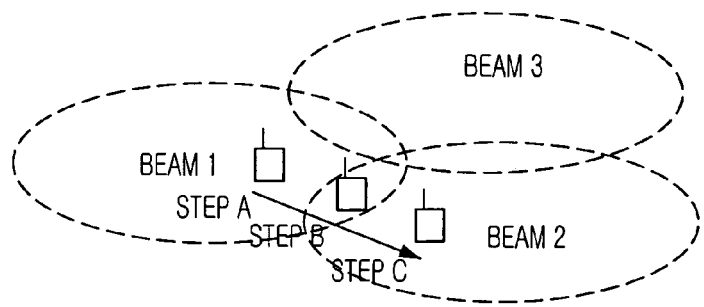
FIG. 16 is an exemplary diagram describing beam selection and hand-off which are performed when a user moves between beams in accordance with an embodiment of the present invention.

FIG. 16 is an exemplary diagram describing beam selection and hand-off, which are performed when a user moves between beams, in accordance with an embodiment of the present invention. In the drawing, the dotted circle indicates a service coverage zone of each beam.

In steps A, B and C, a user estimates a signal-to-interference-and-noise ratio (SINR) with respect to the pilot signal of each beam, which is received through the pilot subcarriers, and periodically reports the SINR to the earth station through a reverse link. The service beam is selected as a beam having the largest pilot SINR.

When the average received signal-to-interference-and-noise ratio of user u with respect to the pilot of beam b is $\Gamma_{b,u}$, a beam having the largest $\Gamma_{b,u}$ becomes the primary (service) beam $B_P$, according to Equation 6.

$$B_P = \underset{b}{\mathrm{argmax}}\, \Gamma_{b,u},\ b = 1, 2, \ldots, N_B \qquad \text{Eq. 6}$$

Also, as shown in Equation 7, if there is a difference between the $\Gamma_{Bp,u}$ (dB) of the primary beam and the average received SINR (dB) of a beam within the threshold value $\Gamma^*$ (dB), the beam is defined as the secondary beam. The secondary beam becomes a candidate beam for the service for the user u.

$$b \in B_S,\ \text{if}\ \Gamma_{Bp,u} - \Gamma_{b,u} < \Gamma^* \qquad \text{Eq. 7}$$

When the user u in the packet transmission service coverage of the beam 1 moves to the coverage zone of the beam 2, handoff is performed through three steps.

In step A, the beam 1 becomes the primary beam for the user u. The user u receives a radio resource allocation message from the control subframe of the beam 1, and receives a packet transmitted to him from the traffic subframe of the beam 1.

In step B, the user u enters a region where the signal intensities of the beams 1 and 2 are almost the same. In this case, one of the beams 1 and 2 becomes the primary beam, and the other one becomes the secondary beam. The earth station receives the measurement report on the received pilot SINR for the beams 1 and 2 from the user, and selects a beam having the largest value as the primary beam for the user u.

The intensity of pilot signal from each beam is changed as the user moves, and the earth station selects the primary beam based on the report from the user every reporting period. The earth station selects a beam having the strongest pilot SINR as the primary beam for the user.

The earth station transmits to the user a radio resource allocation message in the control subframe of the selected primary beam and a data packet in the traffic sub-frame. The user detects the allocation message received in the control subframe to know which beam and radio resource units the earth station used for transmitting the data packet to him, and receives the data packet in the used radio resource units of the traffic subframe.

The step C is a case where the user is out of the common service coverage zone of the two beams, i.e., beams 1 and 2, and serviced only by the beam 2. In this case, there is no secondary beam, and only the beam 2 is selected as a primary beam. The user receives the allocation message in the control subframe of the beam 2 and check if there is a packet transmitted to him.

Figure 17:
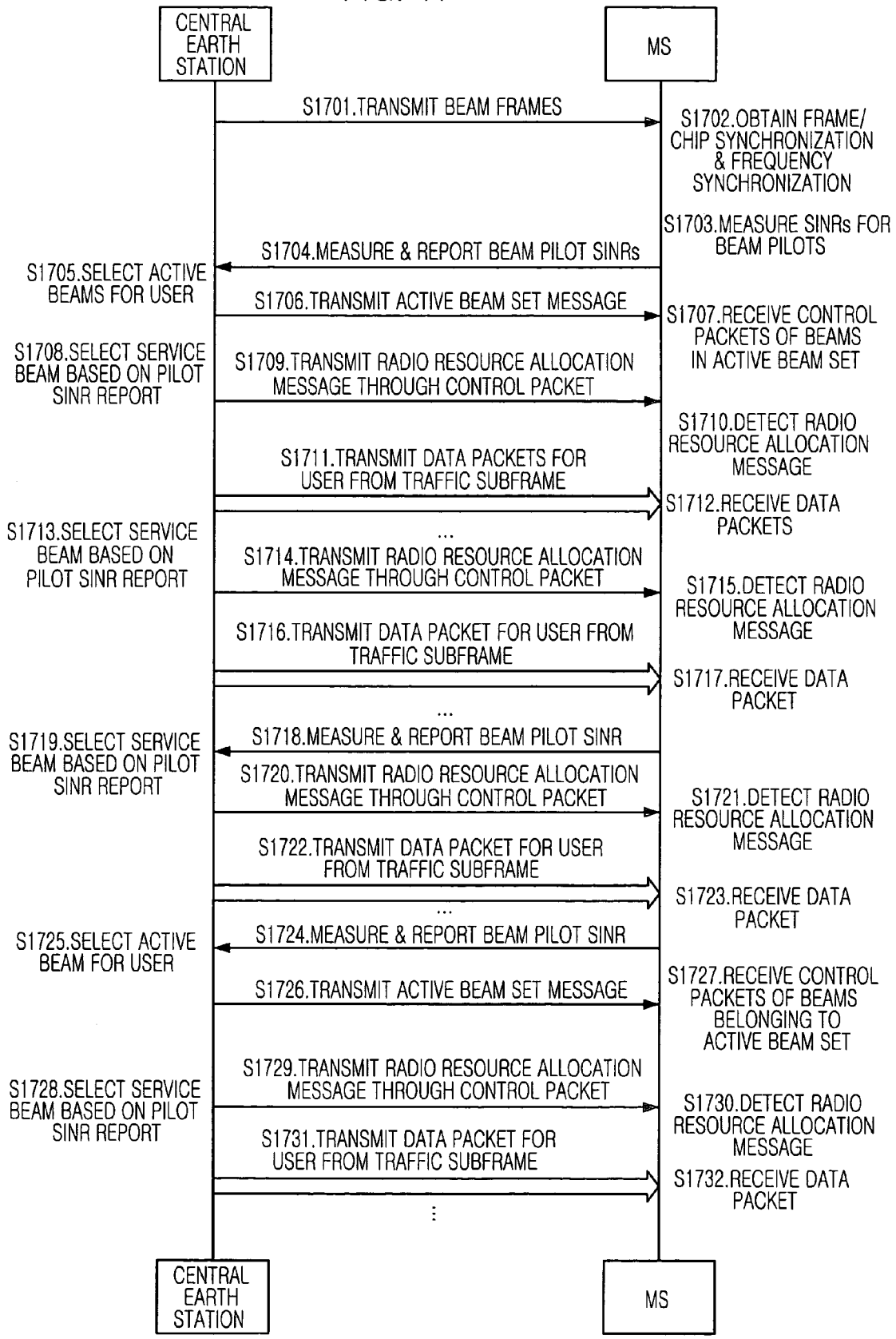
FIG. 17 is a flow chart describing a packet transmission method in the forward link of a multibeam satellite communication system in accordance with an embodiment of the present invention.

FIG. 17 is a flow chart describing a packet transmission method in the forward link of a multibeam satellite communication system in accordance with an embodiment of the present invention.

If the satellite is capable of processing signals and calls, it can perform the role of a central earth station. In this case, the satellite works as the central earth station in FIG. 17.

The packet transmission method illustrated in the drawing does not include the detailed procedure for call processing, such as user registration and authentication, and it focuses on the packet transmission method related to the packet transmission apparatus suggested in the present invention.

As shown in the drawing, the central earth station always transmits the downlink frames, which include the synchronization sequences in the synchronization subframe, through the forward link, at step S1701. At step S1702, the mobile station trying to access to the system for the first time receives the synchronous chip sequences, which are identical and synchronized for all beams, and it acquires the synchronization on frequency, frame and chip to receive the signal transmitted through the forward link.

The mobile station, which has obtained the synchronization, recognizes the positions of the control subframe and traffic subframe and the frequency of the pilot subcarriers, and thus, it can receive the pilot chip sequences transmitted at the pilot subcarriers.

Subsequently, the mobile station searches and detects the pilot spreading codes used in the system, and, at step S1703, it measures the SINRs of the beam pilots. Then, at step S1704, the mobile station reports the pilot SINRs measured to the central earth station through the reverse link. At step S1705, the central earth station selects a beam, which has the largest SINR among the pilot SINR values reported from the mobile station, as the service beam (i.e., the primary beam) for the mobile station, and selects the beams having the pilot SINRs larger than a predetermined threshold value as a candidate beam set (i.e., the secondary beams) for the mobile station.

At step S1706, the central earth station includes a message regarding an active beam set (the service beam and the candidate beam set) in a control packet and transmits the control packet in the control subframe to the mobile station.

At step S1707, the mobile station receives the control packet including the active beam set to thereby recognize the active beam set used for itself. The mobile station then receives the control packets of the beams in the active beam set, and checks if there is a packet transmitted to the mobile station itself.

If packets to be transmitted to the mobile station arrive at the central earth station from a terrestrial network, at step S1708, the central earth station selects a service beam based on the pilot measurement report from the mobile station. Then, at step S1709, it transmits a radio resource allocation message in the control packet of the selected service beam. At step S1711, the central earth station transmits the data packets to the mobile station by using the radio resource units allocated for the packet transmission, in the traffic subframe of the same frame as the control packet is transmitted or in the frame after a predetermined time.

The mobile station receives the radio resource allocation message included in the control packet, which is transmitted from a beam of ones in the active beam set. If the mobile station detects the radio resource allocation message for itself, at step S1710, it receives the data packets through the radio resource units directed by the allocation message, at step S1712.

At steps S1713 to S1717, the packet transmission processes are repeated whenever a packet for the mobile station arrives at the central earth station.

At step S1718, the mobile station periodically measures the beam pilot SINRs and reports them to the central earth station. At step S1719, the central earth station updates the service beam and the active beam set for the user based on the report. At steps S1720 to S1723, the packet transmission is performed through a newly selected service beam.

At steps S1724 and S1725, as the mobile station moves, the active beam set for the mobile station can be changed. At steps S1726 and S1727, the center notifies a newly updated active beam set to the mobile station.

At steps S1728, S1729 and S1731, a packet for the mobile station arrives, and a radio resource allocation message and a data packet are transmitted through the new service beam.

At step S1730, the mobile station receives a radio resource allocation message included in the control packets of the active beams which belong to the updated active beam set, and at step S1732, the mobile station receives a packet transmitted to itself.

According to this packet transmission method described above, the multibeam satellite communication system provides a packet service through a beam whose signal is strongest, regardless of user's moving.

In the above description of the present invention, major parameter values on the frame structure are not given. Specific values for the parameters should be determined in consideration of the used frequency band, the channel characteristics, and the radio transmission and reception schemes at the central earth station and the mobile stations. For example, a radio resource unit may use all the data subcarriers of the system without being discriminated by frequency slots. In this case, the radio resources in a frame would be divided by time slots and spreading codes. Also, even if a satellite is considered in this embodiment, this invention can be applied to a system having a plurality of satellites.

In addition, the present invention can be applied to a system where the satellite performs the role of the central earth station, not simple frequency conversion and amplifying.

Therefore, the protection boundary of the present invention should be defined not by the application objects or embodiments but by the claims enclosed in this specification, and should be understood to include all the various applications and modifications mentioned in the above.

As described above, the packet transmission method of the present invention can be embodied as a program and stored in a computer-readable recording medium, such as CD-ROM, RAM, ROM, floppy disks, hard disks, optical-magnetic disks and the like.

According to the method of the present invention, an orthogonal code set can be shared among downlink beams. Since the orthogonal code set are used and shared among the beams, the inter-beam interference can be minimized and thus, the system capacity can be increased.

Further, due to the minimized multibeam interference, the multibeam satellite communication system of the present invention can provide high-rate packet transmission services having a high transmission rate.

Also, since the radio resources are reused in the beams, the spectral efficiency of the system can be enhanced.

While the present invention has been described with respect to certain preferred embodiments, it will be apparent to those skilled in the art that various changes and modifications may be made without departing from the scope of the invention as defined in the following claims.

What is claimed is:

1. A method for transmitting packets to mobile stations in a forward link of a multibeam satellite communication system, comprising the steps of:
   a multicarrier satellite system using a packet-switching method, wherein downlink beams of a satellite share a same orthogonal spreading code for transmitting packets to the mobile stations among beams by synchronizing and transmitting signals of all beams, and wherein downlink beams of the satellite have a frame structure that shares the orthogonal spreading codes among users,
   a) generating downlink beam signals by using an identical structure for frames transmitted through the downlink beams and an identical pseudo-noise (PN) scrambling code for generating downlink beam signals; and
   b) synchronizing transmission timing of frames, symbols and spread chips on the downlink beam signals
   wherein signals in the frame are transmitted by a plurality of subcarriers in the frequency domain,
   wherein part of the subcarriers in the frame are pilot subcarriers for transmitting pilot signals, which are separated from each other with a frequency spacing over the whole subcarriers so that the mobile station easily performs the channel estimation on a frequency-selective fading channel,
   wherein the pilot signals transmitted at the pilot subcarriers are signals obtained by spreading a predetermined pilot symbol sequence with an orthogonal pilot spreading code unique to each downlink beam; and
   wherein if the number of pilot spreading codes is less than the number of downlink beams, the same pilot spreading code is reused in downlink beams spaced apart in a predetermined distance and according to a predetermined reuse pattern for transmitting packets to mobile stations in the forward link of the multibeam satellite communication system.

2. The method as recited in claim 1, wherein the frame includes:
   a synchronization subframe for making the mobile station acquire synchronization on the downlink signals easily, when the mobile station accesses the multibeam satellite communication system;
   a control subframe for transmitting control packets; and
   a traffic subframe for transmitting data packets, wherein the signals in the frame are transmitted by the plurality of subcarriers in the frequency domain.

3. The method as recited in claim 2, wherein the synchronization subframe includes a predetermined synchronization chip sequence, which are identical for all the beams of the satellite system and scrambled by an identical PN scrambling code.

4. The method as recited in claim 2, wherein the data of the control packet transmitted in the control subframe is spread by an orthogonal control spreading code unique to each downlink beam, the control spreading code used in the control subframe is one in a control spreading code group unique to each downlink beam, and there is a one-to-one relationship between the pilot spreading code and the control spreading code or control spreading code group.

5. The method as recited in claim 4, wherein if the number of control spreading codes/groups is less than the number of beams, the same control spreading code is reused in beams spaced apart in a predetermined distance or according to a predetermined reuse pattern.

6. The method as recited in claim 2, wherein, except for the pilot subcarriers, the rest of subcarriers in the control subframe and the traffic subframe are data subcarriers used for transmitting the control packet in the control subframe or the data packet in the traffic subframe.

7. The method as recited in claim 6, wherein the data subcarriers are grouped according to a predetermined number of subcarriers in order to form a plurality of frequency slots, and, in the time domain, the control and traffic subframes are divided into a predetermined number of time slots, each slot being divided into a predetermined number of time intervals, each corresponding to a data symbol duration.

8. The method as recited in claim 7, wherein the frequencies of the data subcarriers in each frequency slot are separated from each other in a predetermined frequency spacing within the whole system frequency band.

9. The method as recited in claim 7, wherein the data symbols in each frequency slot are transformed into complex modulation symbols and spread by an orthogonal spreading code, which has a length of the same number of chips as subcarriers in a frequency slot.

10. The method as recited in claim 9, wherein the complex modulation symbols are spread in two dimensions of time and frequency by an two-dimensional orthogonal spreading code, which has a length of the same number of chips that are obtained by multiplying the number of subcarriers in a frequency slot on the frequency domain and the number of chips corresponding to a data symbol duration on the time domain.

11. The method as recited in claim 7, wherein the data symbols in the time slots of a frame are interleaved with each other so that the data symbols belonging to a time slot is scattered with a time spacing within a frame.

12. The method as recited in claim 2, wherein the control subframe and traffic subframe are divided into radio resource units, each unit is defined by is a time slot, a frequency slot and a spreading code, in a three-dimension fashion.

13. The method as recited in claim 12, wherein one or more radio resource units are used for transmitting a data packet to an mobile station, and the mobile station is informed which radio resource units are used for the packet transmission by a radio resource allocation message included in the control packet of the control subframe.

14. The method as recited in claim 12, wherein the same radio resource unit of the traffic subframe is reused for transmitting a packet to another mobile station belonging to another beam, only when the interference between the packet transmissions is not more than a predetermined level.

15. The method as recited in claim 1, wherein the pilot signals are periodically transmitted with a predetermined time interval, and data signals are transmitted at the pilot subcarriers, during the time interval between two consecutive pilot signals together with the pilots signals according to a period.

* * * * *